United States Patent [19]
Kaminski et al.

[11] Patent Number: 6,019,708
[45] Date of Patent: Feb. 1, 2000

[54] TORQUE LIMITING RATCHET FOR BICYCLE MOUNTING EXERCISING DEVICE

[76] Inventors: Joseph W. Kaminski, 4185 Lemoyne Way, Campbell, Calif. 95008; Charles M. Schwimmer, 1820 Gunston Way, San Jose, Calif. 95124

[21] Appl. No.: 08/280,266

[22] Filed: Jul. 26, 1994

[51] Int. Cl.[7] .................................................. F16D 7/06
[52] U.S. Cl. ............................... 482/57; 464/37; 464/40; 464/36; 192/111 A; 192/56.1; 192/56.2; 188/71.9
[58] Field of Search ................................ 464/37, 40, 36; 192/111 A, 56.1, 56.2; 188/71.9; 482/57, 61

[56] References Cited

U.S. PATENT DOCUMENTS

| | | | |
|---|---|---|---|
| 2,576,069 | 11/1951 | Hoag et al. | 64/29 |
| 2,802,354 | 8/1957 | Bohnhoff et al. | 64/29 |
| 3,866,908 | 2/1975 | Hangler . | |
| 3,942,337 | 3/1976 | Leonard et al. | 64/29 |
| 4,421,308 | 12/1983 | Nagy . | |
| 4,768,782 | 9/1988 | Blackburn . | |
| 4,834,363 | 5/1989 | Sargeant et al. . | |
| 4,941,651 | 7/1990 | Phillips . | |

OTHER PUBLICATIONS

Advertisement for "Killer Headwind" trainers, Bicycling Magazine, Dec. 1992, p. 97.

*Primary Examiner*—Stephen R. Crow
*Attorney, Agent, or Firm*—Robert O. Guillot

[57] ABSTRACT

A torque limiting ratchet mechanism disposed within a crank handle. The ratcheting mechanism includes a ratchet disk having inner projecting portions which engage a shaft for rotational purposes, and resilient outwardly projecting portions which are engagable in indentations formed in an inner surface of the ratchet handle. The torque limiting ratchet mechanism of the present invention is particularly utilized in a bicycle mounted exercise trainer. In this utilization, one cone of the mounting system is laterally fixed and the other cone, which is engaged to the torque limiting ratchet is laterally movable to clamp the axle of the rear wheel. Due to the large variation in bicycle rear wheel axle geometries, the roller portion of the wheel resistance mechanism is made longer to accommodate the single-sided movement of the mounting cones of the trainer.

20 Claims, 2 Drawing Sheets

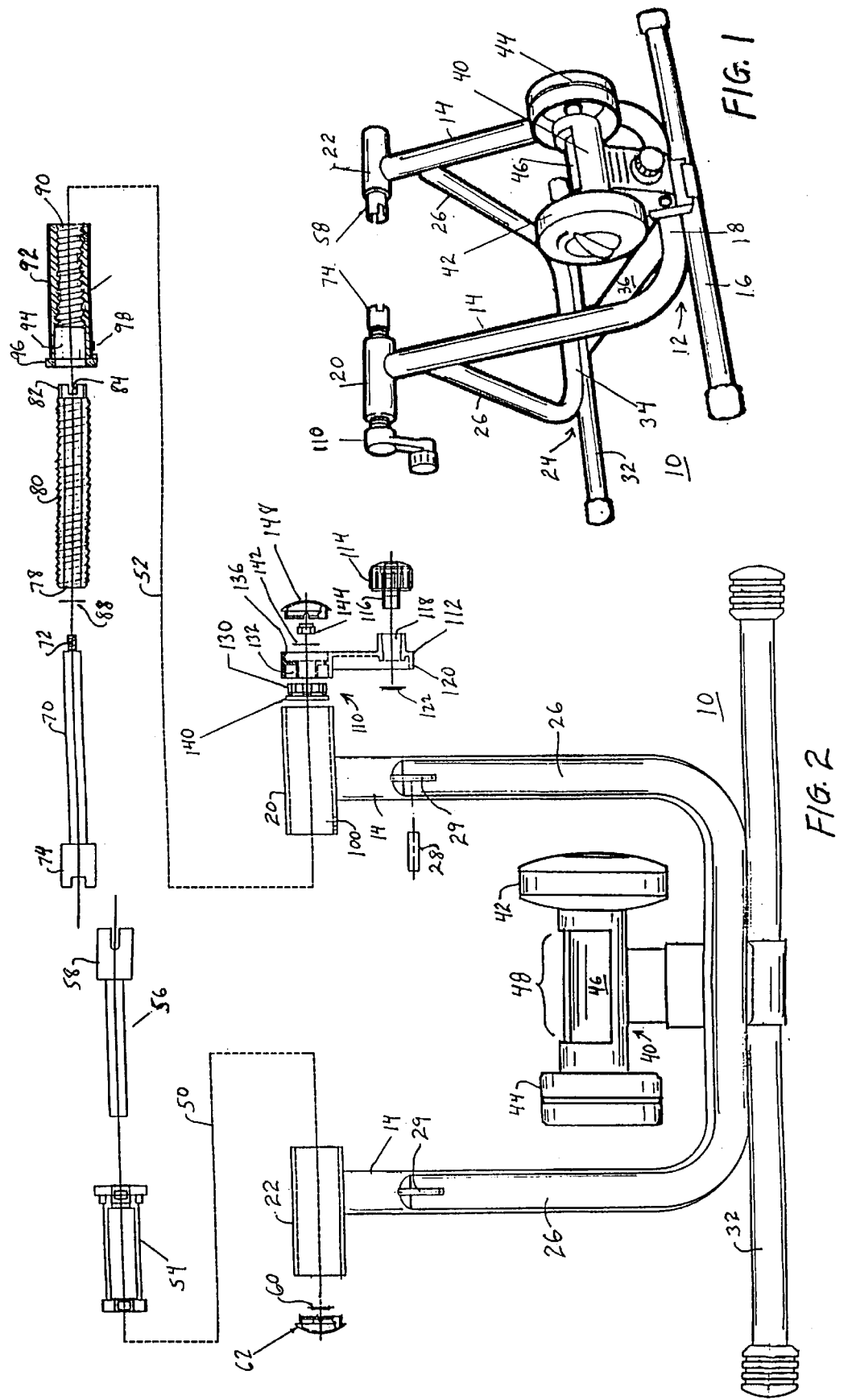

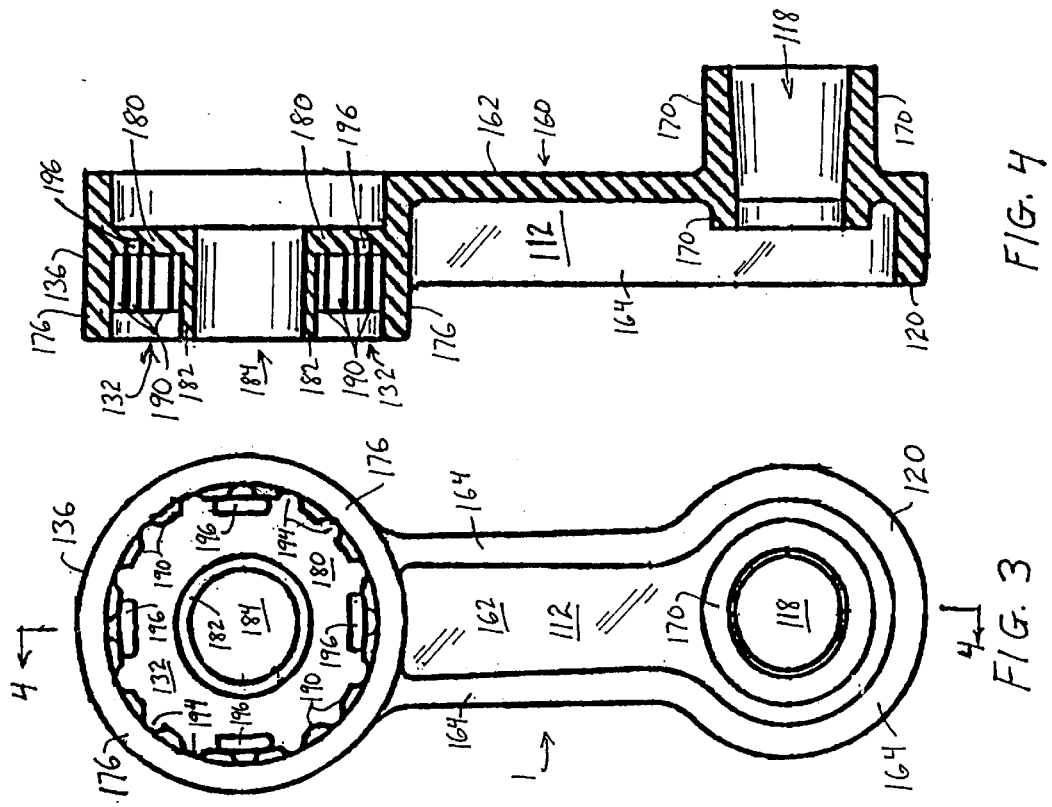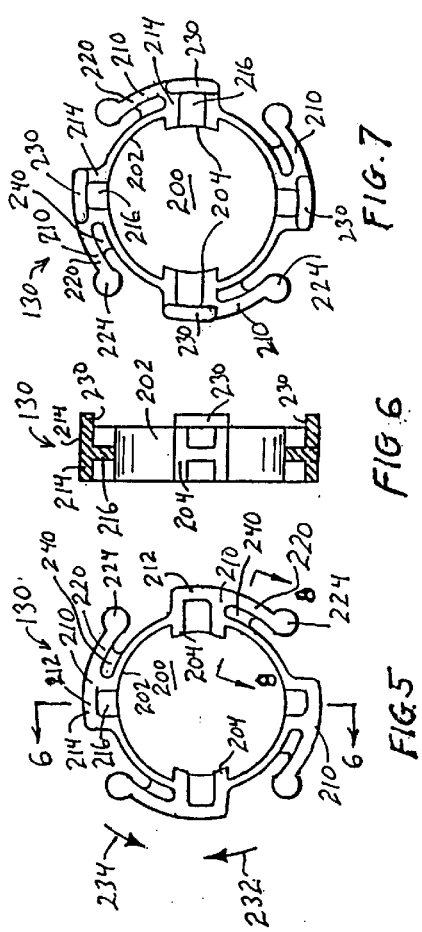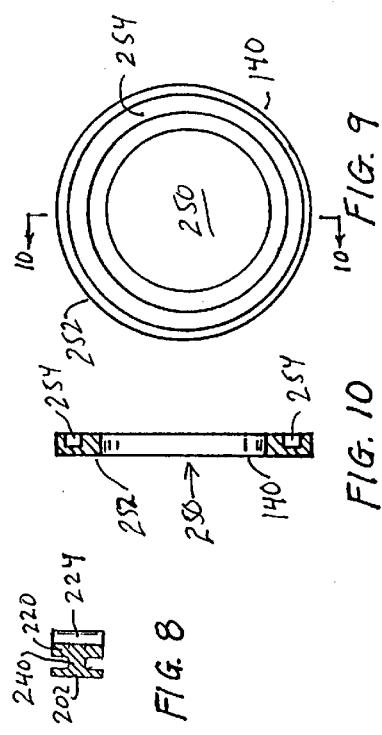

³

TORQUE LIMITING RATCHET FOR BICYCLE MOUNTING EXERCISING DEVICE

BACKGROUND OF THE INVENTION

1. Field of the Invention

The invention relates generally to torque limiting ratchet devices, and more particularly to a torque limiting ratchet device that is utilized with a bicycle mountable exercise device.

2. Description of the Prior Art

Bicycle mounting exercise devices, called trainers, are well known in the prior art. Specific examples are the trainers taught in U.S. Pat. Nos. 4,768,782, issued to Blackburn; 5,152,729, issued to Phillips; 4,941,651, issued to Phillips; 4,969,642, issued to Phillips.

A particular problem with such trainers is the relative difficulty in mounting and dismounting the rear axle of a bicycle within the cones of the mount mechanism. Significant efforts have been expended in the industry to develop a trainer that has a quick, simple bicycle mounting feature.

A further problem in the prior art devices is the user's determination of how tight to mount the rear wheel axle of a bicycle within the mounting cones. If the rear wheel is mounted too loosely the bicycle may slip out of the trainer during usage; thus, potentially injuring both the user and the bicycle. Conversely, if the rear axle is mounted too tightly within the cones it may deform and damage the axle. There is therefore a need for a torque limiting mounting mechanism which is easy to use.

SUMMARY OF THE INVENTION

The present invention includes a torque limiting ratchet mechanism disposed within a crank handle. The ratcheting mechanism includes a one-piece ratchet disk having inner projecting portions which engage a notched end of a threaded shaft for rotational purposes, and resilient outwardly projecting portions which are engagable within indentations formed in an inner surface of the ratchet handle. When the handle is turned the engagement of the ratchet disk within the handle causes the threaded member to turn. Thereafter, when the threaded member experiences sufficient resistance to further rotation, further force on the crank handle causes the resilient outward projections of the ratchet disk to become disengaged from the indentations, thus allowing the handle to continue to rotate or slip while the threaded member does not rotate.

The torque limiting ratchet mechanism of the present invention is particularly utilized in a bicycle mounted exercise trainer. In this utilization, one cone of the mounting system is laterally fixed and the other cone, which is engaged to the torque limiting crank is laterally movable to clamp the axle of the rear wheel. Due to the large variation in bicycle rear wheel axle geometries, the roller portion of the wheel resistance mechanism is made longer to accommodate the single-sided movement of the mounting cones of the trainer.

It is an advantage of the torque limiting crank of the present invention that a single piece ratchet disk is utilized within the device.

It is another advantage of the torque limiting crank of the present invention that a ratchet mechanism is created which is simple to manufacture and easy to install and repair.

It is an advantage of the bicycle mountable exercise device of the present invention that a torque limiting mounting mechanism is provided.

It is another advantage of the bicycle mountable exercise device of the present invention that a mounting mechanism is provided which is easy to use.

It is a further advantage of the bicycle mountable exercise device of the present invention to the torque limiting mounting system is provided which prevents the user from mounting a bicycle too loosely or too tightly within the trainer.

These and other objects, features and advantages of the present invention will become well understood upon reading the detailed description of the invention.

IN THE DRAWINGS

FIG. 1 is a perspective view of a bicycle mountable exercise device of the present invention including the torque limiting crank mounting mechanism of the present invention;

FIG. 2 is an assembly drawing of the bicycle mounting components of the present invention;

FIG. 3 is a side elevational view of the crank handle of the torque limiting ratchet mechanism of the present invention;

FIG. 4 is a cross-sectional view taken along lines 4—4 of FIG. 3;

FIG. 5 is a left side elevational view of the ratchet disk of the present invention;

FIG. 6 is a cross-sectional view of the ratchet disk, taken long lines 6—6 of FIG. 5;

FIG. 7 is a right side elevational view of the ratchet disk of the present invention;

FIG. 8 is a cross-sectional view of a resilient arm portion of the ratchet disk taken along lines 8—8 of FIG. 5;

FIG. 9 is a side elevational view of the ratchet disk cover ring of the present invention; and FIG. 10 is a cross-sectional view of the ratchet disk cover ring, taken along lines 10—10 of FIG. 9.

DETAILED DESCRIPTION OF THE PREFERRED EMBODIMENTS

A bicycle mountable exercise device of the present invention, generally referred to as a trainer, is depicted in FIGS. 1 and 2. The trainer 10 includes a frame structure including rear "U" leg sub-assembly 12 having upwardly extending legs 14, a horizontal floor brace member 16 fixedly engaged to the base portion 18 of the U-shaped leg member, a movable wheel axle support structure tubular member 20 that is fixedly engaged to the upward end of one of the legs 14 and a fixed bicycle wheel axle support structure tubular member 22 that is fixedly engaged to the upward end of the other leg 14. A front "U" leg sub-assembly 24 includes a front, U-shaped member having upwardly extending legs 26 which are pivotally engaged, utilizing pivot pins 28, to flange members 29 towards the upward ends of the legs 14. The front "U" leg sub-assembly also includes a horizontal floor brace member 32 which is fixedly engaged to the base portion 34 of the front U-shaped leg member. A flexible belt 36 functions to limit the pivotal engagement of the front and rear U-shaped leg members.

A bicycle wheel resistance mechanism 40 is adjustably engaged to the base portion 18 of the rear U-leg sub-assembly 12. As depicted in FIGS. 1 and 2, the resistance mechanism 40 includes a magnetic resistance means 42 and a counterbalance wheel 44 that are engaged to the ends of a bicycle wheel engagement roller 46. The exposed horizontal length 48 of the surface of the roller 46 is a novel feature of the trainer 10 when taken in conjunction with the rear axle engagement mechanism of the present invention, as is described herebelow.

The bicycle wheel axle engagement mechanism of the present invention includes a laterally fixed axle engagement member cone assembly 50 and a laterally movable axle engagement member cone assembly 52. The fixed cone assembly 50 includes a cone bushing 54 and a cone shaft 56 having an axle engagement cone member 58 fixedly engaged thereto as by a press-fit engagement therewith. The shaft 56 is rotatably engagable in the bushing 54 and the bushing 54 is fixedly engagable, as though by press-fitting into the fixed horizontal tubular frame member 22. Upon assembly, a retainer ring 60 is engaged to the distal end of the shaft 56 which protrudes through the distal end of the bushing 54, such that the shaft 56 is laterally, fixedly engaged within the bushing 54, yet free to rotate therewithin. In the preferred embodiment of the invention, an end cap 62 is inserted upon the distal end of the tubular mount 22, to prevent dust from entering the mechanism. The preferred embodiment of the movable assembly 52 is described herebelow.

As is well known with trainers of the type depicted in FIGS. 1 and 2, users thereof will seek to mount many different types of bicycle rear wheels therewithin, having rear axles of differing dimensions. Because the differing rear axles have different lengths, the axle engagement cone mechanisms of prior art trainers are made to both be laterally adjustable, such that the bicycle tire may be centrally aligned with the resistance roller 46. However, in the present invention, as described hereinabove, the left (as depicted in FIG. 2) axle engagement cone mechanism 50 is not laterally adjustable. Rather it is laterally fixedly engaged in the tubular mount 22. Thus, the entire axle adjustment mechanism of the present invention resides within the right (as depicted in FIG. 2) axle engagement mechanism 52. Therefore, the rear wheel cannot be centered within the trainer relative to the wheel engagement roller 46 because the fixed cone mechanism 50 cannot be laterally adjusted. To compensate for this non-centering capability, the horizontal length 48 of the roller 46 is increased over the prior art resistance mechanisms to accommodate the installation of off-center rear wheels from bicycles of differing dimensions. The preferred embodiment of the laterally movable bicycle engagement cone mechanism 52 of the present invention is next described.

The laterally movable bicycle axle engagement member cone assembly 52 of the present invention includes a shaft assembly that is mounted within a lateral movement causing means to permit the lateral movement thereof. The shaft assembly includes a machined cylindrical shaft 70 having a threaded distal end portion 72 and a bicycle axle mounting cone member 74 fixedly mounted at the other end thereof, such as by press-fitting. The shaft 70 is rotatably engaged within the bore 78 of an externally threaded shaft movement screw 80. The screw 80 includes an unthreaded distal end 82 having a rotation engagement notch 84 formed therein. A friction washer 88 is engaged about the shaft 70 to facilitate the rotational engagement of the shaft 70 within the threaded screw 80.

The screw 80 is threadably engagable within a threaded bore 90 formed through a generally cylindrical bushing 92. The bore 90 includes an unthreaded front end portion 94 having a sufficient diameter to receive the mounting cone 74 therewithin. The bushing 92 is formed with a smooth cylindrical outer surface and an increased diameter head portion 96 which acts as a stop when the bushing 92 is inserted within the right tubular mount 20. In the preferred embodiment, the bushing 92 is dimensioned to be press-fit within the tubular mount 20; however, a projecting key portion 98 may be provided to mate within a mounting hole or slot 100 formed in the wall of the tubular mount 20. It is therefore to be understood that the movable axle engagement cone mechanism 52 of the present invention includes the bushing 92 which is fixedly engagable within the tubular mount 20. Rotation of the screw 80 within its threaded engagement in the bore 90 will cause the cone engagement head 74 to move laterally owing to its engagement within the bore 78 of the screw 80. The torque limiting ratchet mechanism of the preferred embodiment is preferably utilized to provide rotational force to the screw 80 through the notch 84 in its distal end 82.

As can be basically understood with the aid of FIG. 2, the ratchet mechanism of the present invention 110 includes a handle or crank arm 112 having a crank knob 114 rotatably engaged to a knob shaft 116 that is engaged within a shaft bore 118 formed in a distal end 120 of the crank handle 112. The knob shaft 116 is held within the bore 118 utilizing a retainer ring 122. The ratchet mechanism 110 further includes a ratchet member disk 130 that resides within a generally cylindrical cavity 132 that is formed within the upper head portion end 136 of the crank arm 112. A ratchet disk cover ring 140 serves to hold the ratchet disk 130 within the cavity 132. A circular opening is formed through the cover ring 140 and the ratchet disk 130 of sufficient diameter to permit the end 82 of the screw 80 to protrude therethrough. A flat washer 142 and a lock nut 144 which is threadably engagable with the distal end 72 of the shaft 70 are utilized to engage the laterally movable engagement assembly 52 to the ratcheting mechanism 110. An end cap 148 fits over the screw mounting within the crank end 136 to act as a dust cover. A detailed description of the ratchet mechanism 110 of the present invention is next presented with the aid of FIGS. 3–10.

The detailed features of the crank arm 112 are depicted in FIGS. 3 and 4, wherein FIG. 3 is a side elevational view and FIG. 4 is a cross-sectional view taken along lines 4—4 of FIG. 3. As depicted in FIGS. 3 and 4, the crank arm 112 is preferably a molded plastic member having a central arm portion 160 including a flat base section 162 and raised side walls 164 for structural strength. The distal end 120 includes inner raised circular wall sections 170 which are integrally formed with the base and side wall portions 162 and 164 to create the knob bore 118. The cylindrical ratchet cavity 132 formed in the upper head portion end 136 of the arm 112 is created by an extending cylindrical outer wall portion 176, a disk shaped base portion 180, a projecting inner cylindrical wall portion 182 which serves to define a cone shaft bore 184 through which the cone shaft 70 projects.

A plurality of radially inwardly projecting ratchet ribs 190 are integrally formed in the inward surface of the wall 176 of the cylindrical cavity 132. The ribs 190 do not extend outwardly from the base 180 throughout the entire inner surface of the wall 176, such that the cover ring 140 can be inserted within the outer end of the cylindrical cavity 132. As is best seen in FIG. 3, a curved indentation or ratchet recess 194 is formed between each of the inwardly projecting ratchet ribs 190. The recesses 194 serve as resident locations for projecting ratchet rod portions 224 of the ratchet disk 130 as is described herebelow. Four ratchet disk locking slots 196 are formed in the base wall 180 to facilitate the optional ratchet locking feature of the invention as is described below.

FIGS. 5, 6 and 7 depict the ratchet disk member of the present invention, wherein FIG. 5 will be termed a left side view, FIG. 6 is a cross-sectional view, and FIG. 7 is a right side view. As depicted in FIGS. 5, 6, and 7, the ratchet disk 130 is sized to reside within the cylindrical ratchet cavity 132 of the handle 112. In the preferred embodiment, the ratchet disk 130 is a single molded piece. The disk 130 includes a central orifice 200 that is defined by a cylindrical wall 202, which includes two inwardly projecting notch engagement portions 204. The diameter of the orifice 200 is slightly larger than the diameter of the distal end 82 of the screw 80, and the inwardly projecting portions 204 are sized to reside within the notches 84 formed in the screw end 82, to act as a means to engage the rotatable screw.

Four ratchet members 210 project outwardly from the cylindrical wall 202. The ratchet members 210 are symmetrically disposed at 90° angles relative to each other and are formed identically, such that a detailed description of one member 210 will suffice to describe each of them. Each projecting ratchet member 210 includes a base portion 212 that projects radially outwardly from the wall 202. The base portion is formed with side wall sections 214 and an inner rib portion 216. A resilient arm portion 220 projects circumferentially from the wall 214 and a ratcheting rod portion 224 is formed at the distal end of each arm 220. A portion of the rounded exterior surface of the ratcheting rod 224 extends radially outwardly relative to the outer surface of the arm 220.

The ratchet disk 130 is dimensioned to fit within the cavity 132 of the crank arm 112. Specifically, the outwardly projecting portions of the ratcheting rods 224 are dimensioned to reside within the recesses 194 formed between the ribs 190 within the cavity 132, and the outer surface of the arm portions 220 are dimensioned to fit within the inward projection of the ribs 190. The arm 220 and rods 224 thus act as a means to engage the head portion 136 of the handle 112. Four elongated ratchet lockout projecting pins 230 project from the outer wall portions 214 from the right side only of the ratchet disk 130. The ratchet lockout pins 230 are sized to fit within the ratchet locking slots 196 formed within the cavity 132 if the ratchet disk 130 is placed right side down within the cavity 132; however, if the ratchet disk 130 is placed left side down (as depicted in FIG. 2), then the lockout pins 230 do not reside within the slots 196. The ratchet cover plate 140, as depicted in FIGS. 9 and 10 is a flat cylindrical member having a circular orifice 250 defined by the circular wall 252. A circular lockout pin groove 254 is formed in the wall 252 to provide a circular groove in which the lockout pins 230 project when the disk 130 rotates in the ratcheting mode.

The basic operation of the ratchet mechanism can now be described with the aid of FIGS. 2, 3 and 5. As depicted in FIG. 2, when the axle mounting components 52 are assembled within the tubular mount 20, the distal end 82 of the screw 80 will extend through the bore 90 and the threaded end 72 of the shaft 70 will extend outwardly of the screw end 82. The ratchet mechanism 110 components are further mounted such that the screw end 82 passes through the central orifice 250 of the ratchet ring 140 and the ratchet disk 130 is mounted upon the screw end 82 such that the inwardly projecting notch engagement members 204 are disposed within the notches 84 of the screw 80. As depicted in FIG. 2, the ratchet disk 130 is disposed within the cavity 132 left side down (such that the ratchet lockout pins 230 do not reside within the slots 196). The shaft 70 protrudes through the central orifice 184 of the crank end 136, the flat washer 142 is disposed upon the threaded end 72 and the lock nut 144 is tightened to hold the crank arm 112 upon the assembled engagement shaft and screw 80. In this configuration, it is to be understood that the ratchet disk 130 is fixedly engaged to the screw end 82 through the engagement of the notch engagement projections 204 within the notches 84, and that the ratchet disk 130 is only engaged to the crank arm 112 because the outwardly projecting portions of the ratchet rods 224 reside within the recesses 194 of the crank arm 112.

Upon turning the crank arm 112, the rotary torque of the crank arm is transmitted through the ratchet rods 224 to the ratchet disk 130 and thence to the screw end 82 by the engagement of the notch projections 204 within the screw notches 84. Thus, the rotation of the crank arm 112 causes the screw 80 to rotate within the threaded bushing 92, such that the mounting shaft 70 moves laterally relative to the bushing 92 and tubular mount 20. Thus, when a rear bicycle wheel axle is disposed between the mounting cones 58 and 74, rotation of the crank arm 112 will cause the loosening or tightening of the mounting cones upon the axle disposed therebetween, because the fixed cone 58 does not move whereas the movable cone 74 moves laterally by the rotation of the crank arm.

It is next to be appreciated that when a bicycle rear wheel axle is engaged between the fixed cone 58 and the movable one 74 that further rotation of the crank arm will cause the movable cone to increase the lateral force upon the axle disposed between the cones 58 and 74. When the axle is sufficiently tightly engaged between the cones 58 and 74, further rotational force applied by the user to the crank arm 112 will cause increased torque forces to be applied between the engaged surfaces of the recesses 194 and the projecting surfaces of the ratchet rods 224 disposed therewithin. It is now to be noted that the ratchet rods 224 are disposed upon resilient, cantilevered arm segments 220, such that the increased force on the outer surfaces of the ratchet rods 224 will cause the ratchet rods to be pushed radially inwardly as the outer projecting surfaces of the ratchet rods 224 ride inward and out of the recesses 194 in which they reside. Thus, it is to be appreciated that when sufficient lateral force is applied to the mounted axle of a bicycle, that additional force applied to the crank arm will cause the projecting ratchet rods 224 to come out of their engagement within the recesses 194, thus permitting the crank arm to rotate without causing the ratchet disk to rotate. Simply put, the ratchet disk becomes disengaged with the crank arm because the ratcheting rods 224 have become disengaged within the recesses 194.

After the user has tightened a bicycle axle to the point that the crank handle arm has ratcheted by rotating the crank handle arm in the clockwise direction 232 relative to the ratchet disk 130 (as depicted in FIG. 5), the user will probably at a later time desire to loosen the engagement by rotating the crank handle arm in the opposite (counterclockwise) direction 234 relative to the ratchet disk 130 (as depicted in FIG. 5). Because the projecting ratchet rods are mounted on a generally circumferentially directed cantilevered arm 220, the counterclockwise rotation of the crank arm for loosening the mechanism will cause the ratchet rods 224 to be generally forced into the recesses 194, thus preventing the ratcheting of the crank arm when the user attempts to loosen the device by rotating the crank arm in the counterclockwise direction 234. It is therefore to be understood that the circumferentially directed cantilevered arms 220 facilitate the ratcheting of the ratchet disk 130 when the crank arm is rotated in a clockwise direction 232 (as depicted in FIG. 5), and to prevent the ratcheting of the crank arm when the crank arm is rotated in a counterclockwise direction 234 (as depicted in FIG. 5). This feature is significant in preventing a user from inadvertently tightening the mechanism while ratcheting, to such an extent that the crank arm ratchets when the user attempts to loosen the device.

Upon understanding the basic torque limiting ratcheting feature of the present invention, it will be further understood by the reader that the torque force required to create the ratcheting effect is a function of the radial resilience of the arm portions 220 of the ratchet mechanism 210. In the present invention, the resiliency of the ratchet arm is controlled by several factors, including the dimensions of the rib 190 and recess 194 members of the crank handle 112, the dimensions of the ratcheting rods 224, the dimensions of the ratchet arm 220 and the physical characteristics of the material that composes the ratchet disk 130. Additionally, a significant feature of the present invention that is utilized to control the resiliency of the ratchet arm 220 is the formation of a rib member 240 between the outer surface of the cylindrical wall 202 and the inner surface of the arm 220. The size and location of the rib member 240 provides a convenient means to control the resiliency of the arm 220. As can be seen with the aid of FIG. 8, the rib portion 240 extends between the inner wall 202 and the resilient arm 220, to provide stiffness and thus control of the resilience of the inner portion of the arm 220. The most significant parameter that affects the control of the rib 240 upon the resilience of the arm 220 is the circumferential length of the rib 240 or, conversely, the length of the cantilever portion of the arm 220 beyond the rib 240. As can be seen in FIGS. 5 and 7, approximately ½ of the circumferential length of the arm 220 is cantilevered beyond the length of the rib 240 in the preferred embodiment.

With an understanding of the torque limiting ratcheting effect of the present invention, as described above, wherein the left and side of the ratchet disk 130 is placed downwardly within the cavity 132, the alternative ratchet lockout feature of the present invention is easily comprehended. That is, that when the right hand side of the ratchet disk 130 is placed downwardly within the cavity 132, the ratchet lockout pins 230 project within the ratchet locking slots 196 formed within the base wall 180 of the cavity 132. In this position, although the ratchet rods 224 still reside within ratcheting recesses 194, ratcheting of the crank handle relative to the ratchet disk cannot occur because the ratchet handle is not only engaged to the ratchet disk through the ratchet rods 224 being resident in the recesses 194, but, more importantly, the crank 112 and the ratchet disk 130 are engaged to each other because the lockout pins 230 are disposed within the locking slots 196. Thus, when the crank arm 112 is rotated, the ratchet disk cannot slip or ratchet in its engagement with the ratchet arm, and the full torque of the crank arm will always be transmitted through the ratchet disk to the notches 84 in the screw end 82.

While the present invention has been described with reference to certain preferred embodiments, various alterations and modifications in form and detail will no doubt occur to technically competent individuals that have read and understood the disclosure hereinabove. It is therefore intended that the following claims to the inventions described herein, cover all such alterations and modifications as fall within the true spirit and scope of the invention.

What I claim is:

1. A torque limiting ratchet mechanism comprising;
a handle having a head portion;
a rotatable member being engagable within said head portion of said handle;
a ratchet member being disposed within said head portion of said handle;
said ratchet member having a first means to engage said rotatable member and functioning to fixedly engage said ratchet member to said rotatable member;
said ratchet member having a second means to engage said head portion and functioning to become engaged with said head portion when low torque forces are applied to said handle, and to become disengaged with said head portion when high torque forces are applied to said handle;
said second means including at least one protecting arm portion of said ratchet member, which is engagable within at least one recessed area formed in said head portion; and
wherein said ratchet member is generally disk shaped and said arm portion projects in a generally circumferential direction.

2. A device as described in claim 1 wherein said first means includes at least one projecting notch engagement member formed within said ratchet member, which is engagable within at least one notched recess formed within said rotatable member.

3. A device as described in claim 1 wherein a plurality of projecting arms are formed in said ratchet member and a plurality of recessed areas are formed in said head portion.

4. A device as described in claim 2 wherein a plurality of notch engagement members are formed in said ratchet member.

5. A device as described in claim 1 wherein a plurality of projecting arms are formed in said ratchet member and a plurality of recessed areas are formed in said head portion; and
wherein a plurality of notch engagement members are formed in said ratchet member.

6. A device as described in claim 1 wherein said ratchet member further includes a ratchet lockout means and said head portion includes a ratchet locking means, said lockout means and said locking means acting in cooperation to prevent said ratchet member from becoming disengaged within said head portion.

7. A device as described in claim 6 wherein said lockout means includes at least one projecting pin portion of said ratchet member, and said locking means includes at least one recessed slot area formed in said head portion.

8. A device as described in claim 1 wherein said projecting arm portion of said ratchet member is engaged to other portions of said ratchet member utilizing a relatively thin rib member to partially control the resiliency of said arm portion.

9. A torque limiting ratchet mechanism comprising;
a handle having a head portion;
a rotatable member being engagable within said head portion of said handle;
a ratchet member being disposed within said head portion of said handle;
said ratchet member having a first means to engage said rotatable member and functioning to fixedly engage said ratchet member to said rotatable member;
said ratchet member having a second means to engage said head portion and functioning to become engaged with said head portion when low torque forces are applied to said handle, and to become disengaged with said head portion when high torque forces are applied to said handle; and said first means and said second means being integrally formed within said ratchet member.

10. A device as described in claim 9, wherein said second means includes at least one projecting arm portion of said ratchet member, which arm portion is engagable within at least one recessed area formed in said head portion.

11. A device as described in claim 10 wherein said ratchet member is generally disk shaped and having a central axis thereof, and said arm portion projects in a generally radial direction relative to said central axis.

12. A device as described in claim 9 wherein said first means includes at least one projecting notch engagement member formed within said ratchet member, which is engagable within at least one notched recess formed within said rotatable member.

13. A device as described in claim 9 wherein said second means includes at least one projecting arm portion of said ratchet member, which is engagable within at least one recessed area formed in said head portion; and wherein said first means includes at least one projecting notch engagement member formed within said ratchet member, which is engagable within at least one notched recess formed within said rotatable member.

14. A device as described in claim 10 wherein a plurality of projecting arms are formed in said ratchet member and a plurality of recessed areas are formed in said head portion.

15. A device as described in claim 12 wherein a plurality of notch engagement members are formed in said ratchet member.

16. A device as described in claim 15 wherein a plurality of projecting arms are formed in said ratchet member and a plurality of recessed areas are formed in said head portion; and wherein a plurality of notch engagement members are formed in said ratchet member.

17. A device as described in claim 16 wherein said ratchet member is generally disk shaped and said arm portion projects in a generally circumferential direction.

18. A device as described in claim 9 wherein said ratchet member further includes a ratchet lockout means and said head portion includes a ratchet locking means, said lockout means and said locking means acting in cooperation to prevent said ratchet member from becoming disengaged within said head portion.

19. A device as described in claim 18 wherein said lockout means includes at least one projecting pin portion of said ratchet member, and said locking means includes at least one recessed slot area formed in said head portion.

20. A device as described in claim 10 wherein said projecting arm portion of said ratchet member is engaged to other portions of said ratchet member utilizing a relatively thin rib member to partially control the resiliency of said arm portion.

\* \* \* \* \*